(12) United States Patent
Zhang et al.

(10) Patent No.: US 12,113,214 B2
(45) Date of Patent: Oct. 8, 2024

(54) POSITIVE ELECTRODE MATERIAL AND PREPARATION METHOD AND USE THEREFOR, LITHIUM-ION BATTERY POSITIVE ELECTRODE POLE PIECE, AND LITHIUM-ION BATTERY

(71) Applicant: Beijing Easpring Material Technology Co., Ltd., Beijing (CN)

(72) Inventors: Xuequan Zhang, Beijing (CN); Wenhui Li, Beijing (CN); Yanbin Chen, Beijing (CN); Yafei Liu, Beijing (CN)

(73) Assignee: BEIJING EASPRING MATERIAL TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/173,532

(22) Filed: Feb. 23, 2023

(65) Prior Publication Data
US 2023/0207802 A1 Jun. 29, 2023

Related U.S. Application Data

(63) Continuation of application No. 17/922,495, filed as application No. PCT/CN2021/112726 on Aug. 16, 2021, now abandoned.

(30) Foreign Application Priority Data

Jun. 30, 2021 (CN) .......................... 202110736089.8

(51) Int. Cl.
*H01M 4/485* (2010.01)
*H01M 4/04* (2006.01)
(Continued)

(52) U.S. Cl.
CPC ......... *H01M 4/525* (2013.01); *H01M 4/0471* (2013.01); *H01M 4/0492* (2013.01); *H01M 4/485* (2013.01); *H01M 4/505* (2013.01); *H01M 4/622* (2013.01); *H01M 4/625* (2013.01); *H01M 10/0525* (2013.01); *H01M 2004/021* (2013.01); *H01M 2004/028* (2013.01)

(58) Field of Classification Search
None
See application file for complete search history.

(56) References Cited

U.S. PATENT DOCUMENTS

2004/0023113 A1  2/2004 Suhara et al.
2015/0221944 A1  8/2015 Uebo et al.
(Continued)

FOREIGN PATENT DOCUMENTS

CN  103811744 A  5/2014
CN  109524642 A  3/2019
(Continued)

OTHER PUBLICATIONS

English translation of CN 110970602 (Year: 2021).*
English translation of KR 2020/0117977 (Year: 2020).*

*Primary Examiner* — Yoshitoshi Takeuchi
(74) *Attorney, Agent, or Firm* — Volpe Koenig

(57) ABSTRACT

The present disclosure relates to the technical field of secondary battery, and discloses a positive electrode material and a preparation method and use therefor, a lithium-ion battery positive electrode poly piece, and a lithium-ion battery.

8 Claims, 3 Drawing Sheets

(51) Int. Cl.
  *H01M 4/505* (2010.01)
  *H01M 4/525* (2010.01)
  *H01M 4/62* (2006.01)
  *H01M 10/0525* (2010.01)
  *H01M 4/02* (2006.01)

(56) References Cited

U.S. PATENT DOCUMENTS

| | | | |
|---|---|---|---|
| 2017/0207454 A1 | 7/2017 | Ota | |
| 2020/0020946 A1 | 1/2020 | Hur et al. | |
| 2020/0411859 A1 | 12/2020 | Kim et al. | |
| 2021/0126242 A1 | 4/2021 | Du et al. | |

FOREIGN PATENT DOCUMENTS

| | | | | |
|---|---|---|---|---|
| CN | 110970602 | * | 4/2020 | ........ H01M 10/0525 |
| CN | 110970602 A | | 4/2020 | |
| CN | 111129448 A | | 5/2020 | |
| CN | 111640912 A | | 9/2020 | |
| CN | 112151794 A | | 12/2020 | |
| CN | 112751032 A | | 5/2021 | |
| CN | 112811477 A | | 5/2021 | |
| EP | 3570352 A1 | | 11/2019 | |
| JP | H11329415 A | | 11/1999 | |
| JP | 2002298847 A | | 10/2002 | |
| JP | 2008214186 A | | 9/2008 | |
| JP | 2009266712 A | | 11/2009 | |
| JP | 2014035859 A | | 2/2014 | |
| JP | 2020517079 A | | 6/2020 | |
| JP | 2020191302 A | | 11/2020 | |
| KR | 10-2013-0117732 A | | 10/2013 | |
| KR | 10-2020-0117977 A | | 10/2020 | |
| KR | 2020/0117977 | * | 10/2020 | .......... H01M 10/052 |
| KR | 10-2020-0130346 A | | 11/2020 | |
| WO | 2014041793 A1 | | 3/2014 | |

* cited by examiner

POSITIVE ELECTRODE MATERIAL AND PREPARATION METHOD AND USE THEREFOR, LITHIUM-ION BATTERY POSITIVE ELECTRODE POLE PIECE, AND LITHIUM-ION BATTERY

CROSS REFERENCE TO RELATED APPLICATIONS

This application is a continuation of U.S. patent application Ser. No. 17/922,495, filed Oct. 31, 2022 as a 35 U.S.C. § 371 national stage of International Application No. PCT/CN2021/112726, which was filed Aug. 16, 2021 and claims priority to Chinese Application No. 202110736089.8, filed on Jun. 30, 2021, entitled "CATHODE MATERIAL, PREPARATION METHOD AND USE THEREOF, CATHODE ELECTRODE OF LITHIUM ION BATTERY, AND LITHIUM ION BATTERY", both of which are incorporated herein by reference.

FIELD

The present disclosure relates to the technical field of secondary battery, in particular to a cathode material, a preparation method and a use thereof, a cathode electrode of lithium ion battery, and a lithium ion battery.

BACKGROUND

With the rapid development of the electric vehicle industry, the cathode material of lithium ion battery with a high energy density and a long service life have attracted great attention. The layered ternary materials (Nickel-Cobalt-Manganese, or NCM) have a relatively high capacity and exhibit great potential for development. However, when the content of nickel in NCM increases, the stability of said material gradually decreases. The highly active ions $Ni^{4+}$ generated during the charging process will react with an electrolyte to form NiO like rock salt phases, which severely damage the structure of said layered material, result in collapse of the cathode structure, thereby inducing the dissolution of transition metal ions, phase transformation and precipitation of lattice oxygen. The "secondary particles" of conventional multicrystal NCM at present are generally composed of many nanometer-scale "primary particles", and the changes of lattice parameters will lead to the formation of micro-cracks during the charging and discharging process. The formed micro-cracks may expose fresh interfaces inside the particles, further accelerating the structural attenuation. It shall be noted that the higher is the nickel content, the more pronounced is the destructive effect of the cracks. To sum up, a major cause of the reduced cycle life of NCM, especially NCM with high nickel content, is the micro-cracks, which will result in simultaneous reduction of thermal stability, structural stability and cycling stability of the cathode material.

In regard to the serious defect and problem that the NCM materials with a high nickel content suffer from the micro-cracks during the cycling process, the widespread solutions are focused on improving both the doping and the cladding processes of the materials. However, the two processes have limited effect on the improvement of the individual multicrystal particles, especially for the multicrystal materials with a narrow range of particle distribution. As a result, it is necessary to develop a new type of multicrystal material and an adaptive process thereof.

The Chinese patent application CN103811744A discloses a method for preparing a ternary cathode material of a lithium ion battery. The method comprises the following steps: initially preparing an aggregate material A from a lithium source and a precursor, preparing a single-crystal or quasi single crystal material B from a lithium source and a precursor, uniformly mixing the aggregate material A and the single-crystal or quasi single crystal material B, sintering to form a material C, and cladding the powder of said material C with a coating, thereby obtaining the lithium-ion ternary cathode material. The multicrystal and the single-crystal or quasi single crystal ternary material with different granularity and shapes are mixed, and the single-crystal particles can be effectively arranged among the aggregate particles, so that the graded materials are in full contact with a conductive agent and an adhesive, the space utilization rate and the compaction density of the materials can be both improved, such that the volume energy density of the materials is improved, the electrical property of the materials is fully exerted, the effect of improving heat stability of the material is produced, and the safety of the battery is enhanced. However, the process is complicated, and requires a high cost, it is not conducive to the practical production.

CN109524642A discloses a method for preparing a hybrid ternary cathode material. The method comprises the following steps: (1) mixing a ternary material precursor A, a ternary material precursor B and a lithium source to obtain an initial mixture; (2) performing a first sintering on the initial mixture at the temperature of 350-550° C., grinding the sintered material, and performing a second sintering at the temperature of 750-1,150° C., so as to obtain the diversified hybrid ternary cathode material in which the secondary particle multicrystal and the single crystal/quasi single crystal morphology coexist, thereby improving the compaction density and the cycle stability of the material and reducing the preparation costs. It is well known among those skilled in the art that the sintering process after adding a lithium source and mixing uniformly is crucial to the materials, and the proportionality, sintering temperature and sintering time are different during the process of sintering the precursors having different Ni content to form the optimal conditions, whereas the prior art uniformly sinters two precursors having different Ni content, it cannot balance and make compromise such that the cathode material formed by sintering two precursors having different Ni content reaches the optimal performance.

CN110970602A discloses a cathode active material, wherein a low-nickel single crystal material and a high-nickel multicrystal material are mixed as the cathode active material; however, the finally produced material has a significantly reduced capacity relative to the high-nickel multicrystal material, so that the advantages of the high-nickel material cannot be really exploited.

SUMMARY

The present disclosure aims to overcome the problems in the prior art with respect to the decreased stability and reduced capacity of the high nickel cathode material due to an existence of micro-cracks in the high nickel cathode material, and provides a cathode material, a preparation method and a use thereof, a cathode electrode of lithium ion battery, and a lithium ion battery. The cathode material comprises multicrystal particles A and single crystal particles or quasi single crystal particles B, whereby it can significantly suppress generation of micro-cracks in the cathode material, and enhance the particle strength of the cathode material, so that the cathode material has a high compaction density and a high compressive strength, thereby ensuring that a battery comprising the cathode material has a high volumetric energy density and a relatively long cycle life.

In order to fulfill the above purpose, a first aspect of the present disclosure provides a cathode material, wherein the cathode material comprises multicrystal particles A and single crystal particles or quasi single crystal particles B;

the particle diameters $D_5$, $D_{50}$ and $D_{95}$ of the cathode material satisfy the relationship shown in Formula I:

$$1.5 \leq K95 = (D_{95} - D_5)/D_{50} \leq 2.5 \qquad \text{Formula I.}$$

A second aspect of the present disclosure provides a method for preparing the aforementioned cathode material comprising the following steps:

(1) subjecting a transition metal precursor $Ni_{x1}Co_{y1}Mn_{z1}(OH)_2$, lithium salt, and an optional additive to blending and a first sintering to obtain a first sintered material;

(2) subjecting the first sintered material and an optional conductive graphite and/or conductive polymer to blending and a second sintering to obtain multicrystal particles A;

(3) subjecting a transition metal precursor $Ni_{x2}Co_{y2}Mn_{z2}(OH)_2$, lithium salt and an optional additive to blending and a third sintering to obtain single crystal particles or quasi single crystal particles B;

(4) mixing the multicrystal particles A with the single crystal particles or quasi single crystal particles B to prepare the cathode material;

wherein $x1+y1+z1=1$, $0.5 \leq x1 \leq 1$, $0 \leq y1 \leq 0.5$, $0 \leq z1 \leq 0.5$;

$x2+y2+z2=1$, $0.5 \leq x2 \leq 1$, $0 \leq y2 \leq 0.5$, $0 \leq z2 \leq 0.5$, $-0.05 \leq x1-x2 \leq 0.05$.

In a third aspect, the present disclosure provides a use of the aforementioned cathode material in a lithium ion battery.

In a fourth aspect, the present disclosure provides a cathode electrode of lithium ion battery, wherein the cathode electrode of lithium ion battery is prepared with the aforementioned cathode material.

A fifth aspect of the present disclosure provides a lithium ion battery, wherein the lithium ion battery comprises the aforementioned cathode electrode of lithium ion battery.

Due to the above technical solution, the cathode material, a preparation method and a use thereof, a cathode electrode of lithium ion battery, and a lithium ion battery provided by the present disclosure produce the following favorable effects:

(1) in the present disclosure, the cathode material comprises multicrystal particles A and single crystal particles or quasi single crystal particles B, whereby it can significantly suppress generation of micro-cracks in the cathode material, and enhance the particle strength of the cathode material, in particular, the multicrystal particles A are able to suppress the generation of micro-cracks, the single crystal particles or quasi single crystal particles are capable of effectively limiting the cracking of the particles A, and ultimately cause that the cathode material has a high compaction density and a high compressive strength, thereby ensuring that a battery comprising the cathode material has a high volumetric energy density and a relatively long cycle life.

(2) Further, the cathode material in the present disclosure comprises multicrystal particles A having a relatively high grain strength, and furthermore, the inclusion of a cladding layer in the multicrystal particles A enables the multicrystal particles A to have a certain elasticity, thereby reducing the proportion of the cathode material thus obtained that is crushed during a process of grinding the electrode, and the extrusion on the current collector is relatively small; on the other hand, the high-strength cathode particles can also suppress the generation of micro-cracks in the material during the charging and discharging process.

(3) Further, the present disclosure defines a solution of separately preparing the multicrystal particles A and the single crystal or quasi single crystal particles B, so that the two materials obtain the optimum properties respectively, and blending the multicrystal particles A and the single-crystal or quasi single crystal particles B having a similar content with Ni, the safety and cycle stability of the cathode material can be remarkably improved under a premise of maintaining high charge and discharge capacity of the multicrystal particles A having a high nickel content.

DETAILED DESCRIPTION

Figure 1:
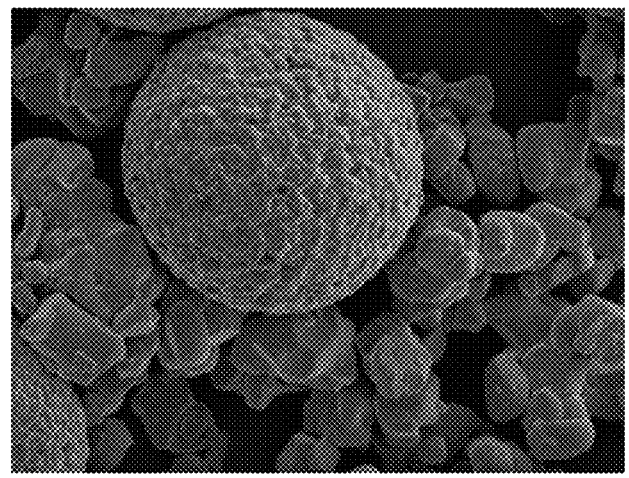
FIG. 1 illustrates the Scanning Electron Microscopy (SEM) image of the cathode material of Example 1 of the present disclosure.

The terminals and any value of the ranges disclosed herein are not limited to the precise ranges or values, such ranges or values shall be comprehended as comprising the values adjacent to the ranges or values. As for numerical ranges, the endpoint values of the various ranges, the endpoint values and the individual point value of the various ranges, and the individual point values may be combined with one another to produce one or more new numerical ranges, which should be deemed have been specifically disclosed herein.

A first aspect of the present disclosure provides a cathode material, wherein the cathode material comprises multicrystal particles A and single crystal particles or quasi single crystal particles B;

the particle diameters $D_5$, $D_{50}$ and $D_{95}$ of the cathode material satisfy the relationship shown in Formula I:

$$1.5 \leq K95 = (D_{95} - D_5)/D_{50} \leq 2.5 \qquad \text{Formula I.}$$

In the present disclosure, when the cathode material comprises multicrystal particles A and single crystal particles or quasi single crystal particles B, and the particle diameters $D_5$, $D_{50}$ and $D_{95}$ of the cathode material satisfy the aforementioned relationship, it can significantly suppress generation of micro-cracks in the cathode material, and enhance the particle strength of the cathode material, in particular, the multicrystal particles Aare able to suppress the generation of micro-cracks, the single crystal particles or quasi single crystal particles are capable of effectively limiting the cracking of the particles A, and ultimately cause that the cathode material has a high compaction density and a high compressive strength, thereby ensuring that a battery comprising the cathode material has a high volumetric energy density and a relatively long cycle life.

In the present disclosure, the particle diameters $D_5$, $D_{50}$ and $D_{95}$ of the cathode material are measured by a laser particle analyzer.

According to the present disclosure, $1.5 \leq K95 \leq 2$.

According to the present disclosure, the multicrystal particles A have a particle diameter $D_{50}$ within a range of 7-22 μm.

Further, the multicrystal particles A have a particle diameter $D_{50}$ within a range of 11-20 μm.

According to the present disclosure, the particle diameters $D_5$, $D_{50}$ and $D_{95}$ of the multicrystal particles A satisfy the relationship shown in Formula II:

$$0 < K_A 95 = (D_{95} - D_5)/D_{50} \leq 1 \qquad \text{Formula II}$$

In the present disclosure, when the particle diameters $D_5$, $D_{50}$ and $D_{95}$ of the multicrystal particles A satisfy the aforementioned relationship, the cathode material particles can exhibit excellent uniformity and homogeneity, such that the cathode material particles have a controllable extent of shrinkage and expansion during long-term use, and the crystal structure on the surface of the material is more stable, and cycle stability during the long-term use is desirable.

Further, $0.55 < K_A 95 = (D_{95} - D_5)/D_{50} \leq 0.95$.

According to the present disclosure, the single crystal particles or quasi single crystal particles B have a particle diameter $D_{50}$ within a range of 0.2-7 μm.

Further, the single crystal particles or quasi single crystal particles B have a particle diameter $D_{50}$ within a range of 2-5 μm.

According to the present disclosure, the particle diameters $D_5$, $D_{50}$ and $D_{95}$ of the single crystal particles or quasi single crystal particles B satisfy the relationship shown in Formula III:

$$0.2 \leq K_B 95 = (D_{95} - D_5)/D_{50} \leq 3 \qquad \text{Formula III}$$

Further, $1.5 \leq K_B 95 = (D_{95} - D_5)/D_{50} \leq 2.5$.

According to the present disclosure, the cathode material has a composition represented by Formula (1):

$$[Li_{1+a}(Ni_x Co_y Mn_z M_{1-x-y-z}) N_k O_{2-w} J_w] \qquad (1)$$

in the Formula (1), $0 \leq a \leq 0.3$, $0 < x \leq 1$, $0 \leq y \leq 1$, $0 \leq z \leq 1$, $0 \leq k \leq 0.1$, $0 \leq w \leq 0.1$, M is at least one selected from the group consisting of B, Na, K, Mg, Al, Ca, Ti, Fe, Zn, Sr, Y, Zr, Nb, Mo, Sn, Ba, Ta and W;

N is at least one selected from the group consisting of B, Mg, Al, Ti, V, Sr, Y, Zr, Nb, Mo and W;

J is at least one selected from the group consisting of F, Cl and P.

According to the present disclosure, the surface of the multicrystal particles A is coated with a cladding layer P.

In the present disclosure, the surface of the multicrystal particles A is coated with a cladding layer P, enabling the multicrystal particles A to have a certain elasticity, thereby reducing the proportion of the cathode material that is crushed during a process of grinding the electrode decreasing the extrusion on the current collector, and suppressing the generation of micro-cracks on the cathode material during the charging and discharging process.

According to the present disclosure, a mass ratio of the multicrystal particles A to the cladding layer P is 1:0-0.05, based on the total weight of the multicrystal particles A.

Further, a mass ratio of the multicrystal particles A to the cladding layer P is 1:0.001-0.02, based on the total weight of the multicrystal particles A.

According to the present disclosure, the cladding layer P is provided by conductive graphite and/or conductive polymer.

Based on the present disclosure, the conductive polymer is at least one selected from the group consisting of polyaniline, polypyrrole, polythiophene, polyacetylene, poly(para-phenylene sulfide), poly(3,4-ethylenedioxythiophene) and polyphenylacetylene.

In the present disclosure, the multicrystal particles A have a composition represented by Formula (2):

$$[Li_{1+a1}(Ni_{x1} Co_{y1} Mn_{z1} M'_{1-x1-y1-z1}) N'_{k1} O_{2-w1} J'_{w1}] \qquad (2);$$

in the Formula (2), $0 \leq a1 \leq 0.3$, $0 < x1 \leq 1$, $0 \leq y1 \leq 1$, $0 \leq z1 \leq 1$, $0 \leq k1 \leq 0.1$, $0 \leq w1 \leq 0.1$, and M' is at least one selected from the group consisting of B, Na, K, Mg, Al, Ca, Ti, Fe, Zn, Sr, Y, Zr, Nb, Mo, Sn, Ba, Ta and W;

N' is at least one selected from the group consisting of B, Mg, Al, Ti, V, Sr, Y, Zr, Nb, Mo and W;

J' is at least one selected from the group consisting of F, Cl and P.

In the present disclosure, the single crystal particles or quasi single crystal particles B have a composition represented by Formula (3):

$$[Li_{1+a2}(Ni_{x2} CO_{y2} Mn_{z2} M''_{1-x2-y2-z2}) N''_{k2} O_{2-w2} J''_{w2}] \qquad (3);$$

In formula (3), $0 \leq a2 \leq 0.3$, $0 < x2 \leq 1$, $0 \leq y2 \leq 1$, $0 \leq z2 \leq 1$, $0 \leq k2 \leq 0.1$, $0 \leq w1 \leq 0.1$, M'' is at least one selected from the group consisting of B, Na, K, Mg, Al, Ca, Ti, Fe, Zn, Sr, Y, Zr, Nb, Mo, Sn, Ba, Ta and W;

N'' is at least one selected from the group consisting of B, Mg, Al, Ti, V, Sr, Y, Zr, Nb, Mo and W;

J'' is at least one selected from the group consisting of F, Cl and P.

According to the present disclosure, a mass ratio of the multicrystal particles A to the single crystal particles or quasi single crystal particles B in the cathode material is 0.01-9:1.

Further, a mass ratio of the multicrystal particles A to the single crystal particles or quasi single crystal particles B is 0.25-4:1.

According to the present disclosure, an individual particle strength of the multicrystal particles A in a test of the micro-mechanical testing machine is greater than or equal to 50 MPa; a deformation quantity of the multicrystal particles A prior to fracture is within a range $D_{50} \times (5\text{-}25\%)$ of the multicrystal particles A.

Figure 4:
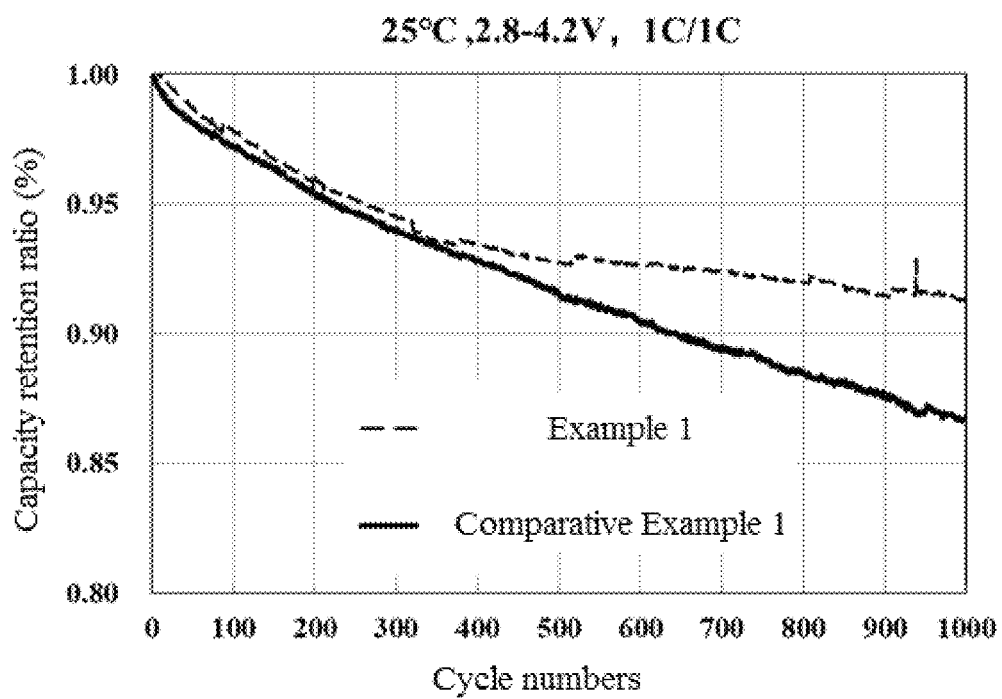
FIG. 4 illustrates the cycle curves of the pouch cells produced from the cathode material prepared in Example 1 and the sample in Comparative Example 1, respectively.

In the present disclosure, under a pressure condition, the multicrystal particles A initially undergo a minute deformation and eventually break down completely along with an increased pressure. As shown in FIG. 4, the deformation quantity of the particles initially exhibits a tendency of slow change under a circumstance of small pressure, the variation at the moment represents the strength of said multicrystal particles A, the greater is the strength, the longer is the slowly increased displacement diameter. As the pressure increases, the particle cracks and its deformation quantity increases rapidly and shows a linear change, this stage has a strong relationship with the internal crystal structure of the initial multicrystal particles A. That is, the slower is the displacement diameter of the multicrystal particles under the pressure condition prior to the linear change, the larger is the deformation quantity before the cracking, indicating the higher is the strength of the particles.

In the present disclosure, an individual particle strength of the multicrystal particles A in a test of the micro-mechanical testing machine is within a range of 50-200 MPa; a deformation quantity of the multicrystal particles A prior to fracture is within a range $D_{50} \times (10\text{-}25\%)$ of the multicrystal particles A.

According to the present disclosure, the cathode material has a powder compaction density greater than or equal to 3.5 g/cm$^3$ under a pressure condition of 20 kN.

Further, the cathode material has a powder compaction density within a range of 3.5-4.5 g/cm$^3$ under a pressure condition of 20 kN.

According to the present disclosure, a specific surface area of the cathode material is denoted as A1, the specific surface area of the cathode material after a pressure fracturing of 4.5 T is denoted as A2;

wherein (A2−A1)/A1×100%≤40%.

Further, (A2−A1)/A1×100% is within a range of 5-30%.

In a second aspect, the present disclosure provides a method for preparing the aforementioned cathode material comprising the following steps:
(1) subjecting a transition metal precursor $Ni_{x1}Co_{y1}Mn_{z1}(OH)_2$, lithium salt, and an optional additive to blending and a first sintering to obtain a first sintered material;
(2) subjecting the first sintered material and an optional conductive graphite and/or conductive polymer to blending and a second sintering to obtain multicrystal particles A;
(3) subjecting a transition metal precursor $Ni_{x2}Co_{y2}Mn_{z2}(OH)_2$, lithium salt and an optional additive to blending and a third sintering to obtain single crystal particles or quasi single crystal particles B;
(4) mixing the multicrystal particles A with the single crystal particles or quasi single crystal particles B to prepare the cathode material;
wherein x1+y1+z1=1, 0.5≤x1≤1, 0≤y1≤0.5, 0≤z1≤0.5;

$$x2+y2+z2=1,\ 0.5 \le x2 \le 1,\ 0 \le y2 \le 0.5,\ 0 \le z2 \le 0.5,$$
$$-0.05 \le x1-x2 \le 0.05.$$

In the present disclosure, separately preparing the multicrystal particles A and the single crystal particles or quasi single crystal particles B, so that the two materials obtain the optimum properties respectively, and blending the multicrystal particles A and the single-crystal or quasi single crystal particles B, the safety and cycle stability of the cathode material can be remarkably improved under a premise of maintaining high charge and discharge capacity of the multicrystal particles A having a high nickel content.

According to the present disclosure, the additive is at least one selected from the group consisting of lithium compounds, boron compounds, tungsten compounds, neodymium compounds, aluminum compounds, zirconium compounds, magnesium compounds and chlorides.

In the present disclosure, the lithium compound is at least one selected from the group consisting of $Li_2O$, $LiOH$, $Li_2CO_3$, $LiCl$, $LiF$, $Li_3PO_4$ and $LiBO_2$.

The boron compound is at least one selected from the group consisting of $B_2O_3$, $H_3BO_3$, $Na_2B_4O_7$ and $Li_2B_4O_7$.

The tungsten compound is at least one selected from the group consisting of $WO_2$, $WO_3$, $Na_2WO_4$, $Li_2W_2O_2$ and $Li_2WO_4$.

The neodymium compound is at least one selected from the group consisting of $Nb_2O_5$, $NbO_2$, $Nb_2O_3$ and $NbCls$.

The aluminum compound is at least one selected from the group consisting of $Al_2O_3$, $Al(OH)_3$ and $AlOOH$.

The zirconium compound is at least one selected from the group consisting of $ZrO_2$, $Zr(OH)_4$ and $ZrSiO_4$.

The magnesium compound is at least one selected from the group consisting of $MgO$, $MgCl_2$ and $Mg(OH)_2$.

The chloride is at least one selected from the group consisting of $NaCl$, $KCl$ and $BaCl_2$.

According to the present disclosure, the molar ratio of the transition metal precursor $Ni_{x1}Co_{y1}Mn_{z1}(OH)_2$, the lithium salt and the additive in step (1) is 1:0.99-1.1:0-1.

According to the present disclosure, the first sintering conditions comprise a sintering temperature of 650-850° C. and a sintering time of 15-30 h.

Further, the first sintering conditions comprise a sintering temperature of 680-800° C. and a sintering time of 16-25 h.

According to the present disclosure, the first sintering comprises a temperature rise stage and a constant temperature stage; wherein a ratio of the temperature rise time tr of the temperature rise stage to the constant temperature time tc of the constant temperature stage in step (1) satisfies:

$$0.5 \le t_r/t_c \le 2.5 \quad (4).$$

In the present disclosure, when the ratio of the temperature rise time to the constant temperature time of the sintering process falls into the above range, the reaction process of the material during the synthesis process can be effectively controlled, so that the surface of the primary particles is more uniform and smooth, and the secondary particles are denser. The residual alkali on the surface is also effectively controlled, and the strength of said particles is significantly enhanced. Therefore, the cracking degree of the material is effectively reduced and the cycle stability and safety of the material are improved during the long-term use.

Further, $0.6 \le t_r/t_c \le 2$.

According to the present disclosure, a mass ratio of the first sintered material to the conductive graphite and/or the conductive polymer is 1:0-0.05.

Further, the mass ratio of the first sintered material to the conductive graphite and/or the conductive polymer is 1:0.001-0.02.

In a specific embodiment of the present disclosure, the first sintered material, the conductive graphite and the conductive polymer are subjected to blending and a second sintering to obtain multicrystal particles A.

In particular, the mass ratio of the first sintered material, the conductive graphite and the conductive polymer is 1:0.001-0.01:0.001-0.01, preferably 1:0.002-0.008:0.002-0.008.

According to the present disclosure, the second sintering conditions comprise a sintering temperature of 100-500° C. and a sintering time of 4-12 h.

Further, the second sintering conditions comprise a sintering temperature of 200-400° C. and a sintering time of 6-10 h.

According to the present disclosure, a molar ratio of the transition metal precursor $Ni_{x2}Co_{y2}Mn_{z2}(OH)_2$, the lithium salt and the additive in step (3) is 1:0.99-1.1:0-1.

According to the present disclosure, the third sintering conditions comprise a sintering temperature of 800-1,200° C. and a sintering time of 15-30 h.

Further, the third sintering conditions comprise a sintering temperature of 850-1,000° C. and a sintering time of 15-25 h.

According to the present disclosure, a mass ratio of the multicrystal particles A to the single crystal particles or quasi single crystal particles B is 0.01-9:1, preferably 0.25-4:1.

A third aspect of the present disclosure provides a use of the aforementioned cathode material in a lithium ion battery.

A fourth aspect of the present disclosure provides a cathode electrode of lithium ion battery, wherein the cathode electrode of lithium ion battery is prepared with the aforementioned cathode material.

In the present disclosure, the cathode electrode of lithium ion battery can be prepared according to the conventional method in the art, in particular, the cathode electrode of lithium ion battery may be prepared by dispersing the cathode material, a conductive agent and a binder in an organic solvent (e.g., NMP) according to a mass ratio of 90-98:0-8:0.5-8, stirring uniformly and performing a slurry homogenization treatment, then coating the produced slurry on an aluminum foil, drying, cutting and rolling the foil.

In the present disclosure, when the compaction density of the cathode electrode of lithium ion battery is within a range of 3.4-3.6 g/cm$^3$, the deformation quantity of the aluminum foil caused by an extrusion of the cathode particles against the aluminum foil is less than 30%.

In the present disclosure, the deformation quantity of the aluminum foil is measured with a straight scale.

A fifth aspect of the present disclosure provides a lithium ion battery, wherein the lithium ion battery comprises the aforementioned cathode electrode of lithium ion battery.

In the present disclosure, a lithium-ion battery may be prepared with a conventional method in the art. Specifically, a lithium-ion battery is manufactured by subjecting a cathode electrode of lithium ion battery, an anode electrode and separators to winding, encapsulating into a housing, injecting with an electrolyte and sealing.

The present disclosure will be described in detail with reference to examples. In the following example, the particle diameters $D_5$, $D_{50}$ and $D_{95}$ of the multicrystal particles A, single crystal particles or quasi single crystal particles B, and the cathode material were measured by using the following method:

the test was carried out by using a laser particle analyzer with a model Mastersizer2000. The "sample test time" and "background test time" for the test number items in the "Measure" in the software were modified into 6s; the cycle number of the cycle item was measured for 3 times, the delay time was set at 5s, an average result record from the measurement was created by clicking. Next, the "start" button was clicked to automatically operate the measurement background; after the automatic measurement was completed, 40 mL of sodium pyrophosphate was initially added, a small amount of sample was subsequently added with a drug spoon until the shading degree reached ½ of the 10-20% visual area, the "start" button was clicked, the three measurement results and an average thereof were finally recorded.

The compaction density of a cathode electrode was measured by using the following method:

the test was performed using a MCP-PD51 powder resistance meter. A clean and dry aluminum foil was taken, 4 g of the sample to be measured was weighted, and added into the mounted mold, it was required that the material did not stain on inner wall of the mold, the mold was gently shook left and right to flatten the material contained therein, the sample quality and batch number of the sample were input the testing software. The material was subjected to a pressurization test, and the pressurization time was controlled to be about 15-20 min, the pressurization process was stopped when the pressure reached 20KN, the pressure was stabilized for 30s, the pressure was restored to 20KN if the pressure dropped. The testing of sample was then started, and the thickness was recorded after the resistance test was completed, the thickness was finally calculated to obtain the compaction density.

The specific surface area of the cathode material was measured according to the following method:

the test was performed using a MCP-PD51 powder resistance meter. A clean and dry aluminum foil was taken, 5 g of the sample to be measured was weighted, and added into the mounted mold, it was required that the material did not stain on inner wall of the mold, the mold was gently shook left and right to flatten the material contained therein, the sample quality and batch number of the sample were input the testing software. The mold was mounted on a lifter and subjected to testing by applying the pressures of OT (ton) (Ref), 1.5 T, 2.5 T, 3.5 T and 4.5 T, respectively. The pressurization time was controlled to be about 15-20 min, the pressurization process was stopped when the pressure reached a target value, the pressure was stabilized for 30s, the fractured particles were taken out for subjecting to the specific surface area test;

the specific surface area test was carried out using a Tri-star 3020 specific surface area tester, wherein 3 g of sample was weighted, the sample tube was mounted on a vacuum joint at the degassing station port. The heating temperature was set at 300° C., the degassing time was 120 min, and after completion of the degassing process, the sample tube was cooled down. The mass of an empty sample tube and the total mass of degassed samples and the sample tube were input the software interface of the tester, the data of specific surface area (BET method) output after calculation of the software was recorded, so as to accomplish the specific surface area testing of the cathode material sample;

the particle strength of the cathode material was measured by adopting the following method:

the measurement was performed using a MCT-210 miniature compression testing machine. The MCT-210 testing software was first opened, the sample platform was clamped at a middle position of the tabletting, there was not sliding, and ensured that a height of the sample platform was at least 3 cm below the objective lens; the LED light switch was turned on in the main machine, and the hand wheel in the bottom right position in the main machine was shaken to adjust the height of the sample platform till the image of the specimen pellet in the display window of a CCD image was legible, the "start testing" button was clicked to measure the particle diameter, the image of particles before compression was saved; the hand wheel was rotated so as to move the particle apex to the lens focus, the sample platform was pushed to the right to underneath a platen, the compression test was started; after completion of the compression, the sample platform was pushed to the left to underneath the objective lens, the hand wheel was rotated till the image obtained after compression was legible, the images were saved.

The surface morphology of the cathode material and the surface element distribution of the cathode material were measured by using a Scanning Electron Microscope (SEM);

the electrochemical performance and safety properties of the lithium-ion battery were measured and tested according to the National Standard GB/T18287-2000 of lithium-ion battery of China.

Example 1

(1) Preparation of multicrystal particles A: the following compounds were calculated in terms of the molar ratio, wherein the molar ratio of transition metal hydroxide precursor $Ni_{0.83}Co_{0.06}Mn_{0.11}(OH)_2$:LiOH:LiF:$ZrO_2$ was 1:1.03:0.01:0.005, the compounds were blended uniformly and then subjected to sintering at 780° C. for 24 h to obtain a first sintered material; wherein the temperature rise time was 12 h, and the constant temperature time was 12 h;

(2) the first sintered material, artificial graphite and conductive polyaniline were blended according to a mass ratio of 1:0.005:0.005, the compounds were blended by using a high-speed mixer, and then subjected to sintering at 350° C. for 10 h, to finally obtaining the multicrystal particles A coated with a cladding layer P on the surface thereof, the multicrystal particles A had a composition $(Li_{1.03}(Ni_{0.83}Co_{0.06}Mn_{0.11}Zr_{0.005})O_2F_{0.01})0.01P$. The particle diameters $D_5$, $D_{50}$ and $D_{95}$ of the multicrystal particles A were 8.5 μm, 12.6 μm and 18.4 μm, respectively, and $K_A95$ was 0.78; an average particle strength was 98 MPa by testing with a micro-mechanical testing machine, a deformation quantity of the multicrystal particles A prior to fracture was 2.5 μm, which accounted for 19.8% of $D_{50}$ of the particles prior to fracture.

(3) Preparation of single crystal particles or quasi single crystal particles B: the following compounds were calculated in terms of molar ratio, wherein the molar ratio of a transition metal hydroxide precursor $Ni_{0.83}Co_{0.06}Mn_{0.11}(OH)_2$:LiOH:$ZrO_2$ was 1:1.01:0.005, the compounds were blended uniformly and then subjected to sintering at 870° C. for 24 h to obtain the single crystal particles or quasi single crystal particles B having a composition of $Li_{1.01}(Ni_{0.83}Co_{0.06}Mn_{0.11}Zr_{0.005})O_2$, wherein the particle diameters $D_5$, $D_{50}$ and $D_{95}$ of the single crystal particles or quasi single crystal particles B were 2.6 μm, 5.6 μm and 11.3 μm, respectively, and the $K_B95$ was 1.55.

(4) Preparation of cathode material: the multicrystal particles A and the single crystal particles or quasi single crystal particles B were blended according to a mass ratio of 70:30, the compounds were blended by using a high-speed mixer to obtain a cathode material, the composition of said cathode material was $(Li_{1.024}(Ni_{0.83}Co_{0.06}Mn_{0.11}Zr_{0.005})O_2F_{0.007})0.007P$. The particle diameters $D_5$, $D_{50}$ and $D_{95}$ of the cathode material were 2.3 μm, 10.7 μm and 20.5 μm, respectively, and K95 was 1.70.

Upon testing, the cathode material had a powder compaction density reached 3.65 g/cm³ under a pressure condition of 20 kN, the specific surface area A1 of the cathode material was 0.56 m²/g; the specific surface area A2 of the cathode material was 0.68 m²/g after compression with a pressure of 4.5 T, (A2−A1)/A1×100% was 21%.

Figure 2:
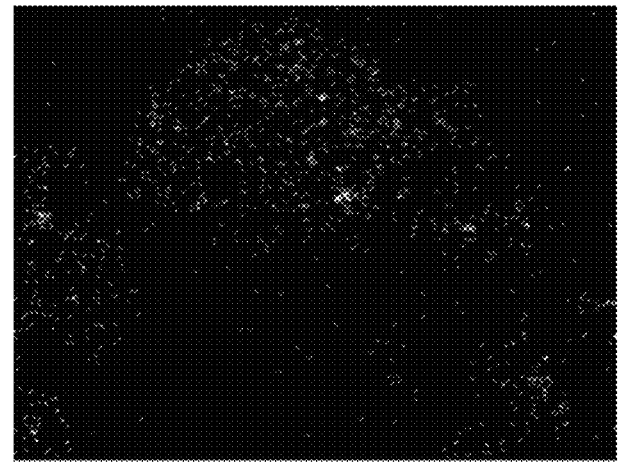
FIG. 2 illustrates the mapping diagram of the distribution of the carbon (C) element of the cathode material of Example 1 of the present disclosure.

The SEM image and the mapping diagram of the distribution of the carbon elements of the cathode material of Example 1 were shown in FIG. 1 and FIG. 2, respectively. As illustrated from FIG. 1, the cathode material was composed of the multicrystal particles and the single crystal particles or quasi single crystal particles, wherein a layer of cladding substance was uniformly dispersed on the surface of large particles. Further, FIG. 2 illustrated the mapping diagram of the distribution of carbon elements of FIG. 1, which can confirm that an elastic cladding layer was uniformly dispersed on the surface of large particles.

Figure 3:
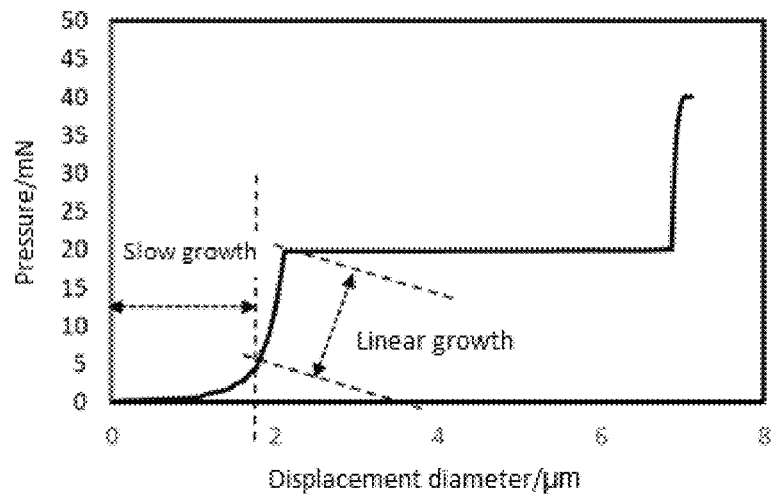
FIG. 3 illustrates the fracture pressure-deformation curve of the cathode material particles of Example 1 of the present disclosure under the micro-mechanical testing machine.

FIG. 3 illustrated a fracture pressure-deformation curve of the individual grain of multicrystal particles A of Example 1 in the testing performed by the micro-mechanical testing machine; as shown in FIG. 3, the displacement diameter of particles was increased slowly along with the increasing pressure, and the displacement diameter increased sharply due to the continuous enlargement of the pressure, the particles were finally fractured.

Example 2

(1) Preparation of multicrystal particles A: the following compounds were calculated in terms of the molar ratio, wherein the molar ratio of transition metal hydroxide precursor $Ni_{0.83}Co_{0.06}Mn_{0.11}(OH)_2$:LiOH:$ZrO_2$ was 1:1.04:0.005, the compounds were blended uniformly and then subjected to sintering at 700° C. for 15 h to obtain a first sintered material; wherein the temperature rise time was 7 h, and the constant temperature time was 8 h;

(2) the first sintered material, artificial graphite and conductive polyaniline were blended according to a mass ratio of 1:0.005:0.005, the compounds were blended by using a high-speed mixer, and then subjected to sintering at 350° C. for 10 h, to finally obtaining the multicrystal particles A coated with a cladding layer P on the surface thereof, the multicrystal particles A had a composition $(Li_{1.04}(Ni_{0.83}Co_{0.06}Mn_{0.11}Zr_{0.005})O_2)0.01P$. The particle diameters $D_5$, $D_{50}$ and $D_{95}$ of the multicrystal particles A were 11.4 μm, 16.7 μm and 24.5 μm, respectively, and $K_A95$ was 0.78; an average particle strength was 95 MPa by testing with a micro-mechanical testing machine, a deformation quantity of the multicrystal particles A prior to fracture was 3.2 μm, which accounted for 19.2% of $D_{50}$ of the particles prior to fracture.

(3) Preparation of single crystal particles or quasi single crystal particles B: the following compounds were calculated in terms of molar ratio, wherein the molar ratio of a transition metal hydroxide precursor $Ni_{0.83}Co_{0.06}Mn_{0.11}(OH)_2$:LiOH was 1:1.02, the compounds were blended uniformly and then subjected to sintering at 870° C. for 24 h to obtain the single crystal particles or quasi single crystal particles B having a composition of $Li_{1.02}(Ni_{0.83}Co_{0.06}Mn_{0.11})O_2$, wherein the particle diameters $D_5$, $D_{50}$ and $D_{95}$ of the single crystal particles or quasi single crystal particles B were 1.8 μm, 3.7 μm and 7.3 μm, respectively, and the $K_B95$ was 1.48.

(4) Preparation of cathode material: the multicrystal particles A and the single crystal particles or quasi single crystal particles B were blended according to a mass ratio of 70:30, the compounds were blended by using a high-speed mixer to obtain a cathode material, the composition of said cathode material was $(Li_{1.034}(Ni_{0.83}Co_{0.06}Mn_{0.11}Zr_{0.0035})O_2)0.007P$. The particle diameters $D_5$, $D_{50}$ and $D_{95}$ of the cathode material were 2.0 μm, 13.2 μm and 26.6 μm, respectively, and K95 was 1.86.

Upon testing, the cathode material had a powder compaction density reached 3.60 g/cm³ under a pressure condition of 20 kN, the specific surface area A1 of the cathode material was 0.61 m²/g; the specific surface area A2 of the cathode material was 0.74 m²/g after compression with a pressure of 4.5 T, (A2−A1)/A1×100% was 21%.

Example 3

(1) Preparation of multicrystal particles A: the following compounds were calculated in terms of the molar ratio, wherein the molar ratio of transition metal hydroxide precursor Ni$_{0.83}$Co$_{0.06}$Mn$_{0.11}$(OH)$_2$:LiOH:LiF:ZrO$_2$ was 1:1.03:0.01:0.005, the compounds were blended uniformly and then subjected to sintering at 780° C. for 24 h to obtain a first sintered material; wherein the temperature rise time was 12 h, and the constant temperature time was 12 h;

(2) the first sintered material and the artificial graphite were blended according to a mass ratio of 1:0.01, the compounds were blended by using a high-speed mixer, and then subjected to sintering at 350° C. for 10 h, to finally obtaining the multicrystal particles A coated with a cladding layer P on the surface thereof, the multicrystal particles A had a composition (Li$_{1.03}$(Ni$_{0.83}$Co$_{0.06}$Mn$_{0.11}$Zr$_{0.005}$)O$_2$F$_{0.01}$)0.01P. The particle diameters D$_5$, D$_{50}$ and D$_{95}$ of the multicrystal particles A were 8.4 μm, 12.5 μm and 18.3 μm, respectively, and K$_A$95 was 0.79; an average particle strength was 89 MPa by testing with a micro-mechanical testing machine, a deformation quantity of the multicrystal particles A prior to fracture was 2.7 μm, which accounted for 21.6% of D$_{50}$ of the particles prior to fracture.

(3) Preparation of single crystal particles or quasi single crystal particles B was performed according to step (3) of Example 1.

(4) Preparation of cathode material: the multicrystal particles A and the single crystal particles or quasi single crystal particles B were blended according to a mass ratio of 70:30, the compounds were blended by using a high-speed mixer to obtain a cathode material, the composition of said cathode material was (Li$_{1.024}$(Ni$_{0.83}$Co$_{0.06}$Mn$_{0.11}$Zr$_{0.005}$)O$_2$F$_{0.007}$)0.007P. The particle diameters D$_5$, D$_{50}$ and D$_{95}$ of the cathode material were 2.3 μm, 10.7 μm and 20.4 μm, respectively, and K95 was 1.69.

Upon testing, the cathode material had a powder compaction density reached 3.63 g/cm$^3$ under a pressure condition of 20 kN, the specific surface area A1 of the cathode material was 0.58 m$^2$/g; the specific surface area A2 of the cathode material was 0.71 m$^2$/g after compression with a pressure of 4.5 T, (A2−A1)/A1×100% was 22%.

Example 4

(1) Preparation of multicrystal particles A: the following compounds were calculated in terms of the molar ratio, wherein the molar ratio of transition metal hydroxide precursor Ni$_{0.83}$Co$_{0.06}$Mn$_{0.11}$(OH)$_2$:LiOH:LiF:ZrO$_2$ was 1:1.03:0.01:0.005, the compounds were blended uniformly and then subjected to sintering at 780° C. for 24 h to obtain a first sintered material; wherein the temperature rise time was 18 h, and the constant temperature time was 9 h;

(2) the step (2) of Example 4 was identical with step (2) of Example 1, to obtain the multicrystal particles A having a composition (Li$_{1.03}$(Ni$_{0.83}$Co$_{0.06}$Mn$_{0.11}$Zr$_{0.005}$)O$_2$F$_{0.01}$)0.01P. The particle diameters D$_5$, D$_{50}$ and D$_{95}$ of the multicrystal particles A were 6.2 μm, 11.9 μm and 17.3 μm, respectively, and K$_A$95 was 0.93; an average particle strength was 102 MPa by testing with a micro-mechanical testing machine, a deformation quantity of the multicrystal particles A prior to fracture was 2 μm, which accounted for 16.8% of D$_{50}$ of the particles prior to fracture.

(3) The step (3) of Example 4 was identical with step (3) of Example 1.

(4) Preparation of cathode material: the multicrystal particles A and the single crystal particles or quasi single crystal particles B were blended according to a mass ratio of 80:20, the compounds were blended by using a high-speed mixer to obtain a cathode material, the composition of said cathode material was (Li$_{1.026}$(Ni$_{0.83}$Co$_{0.06}$Mn$_{0.11}$Zr$_{0.005}$)O$_2$F$_{0.008}$)0.008P. The particle diameters D$_5$, D$_{50}$ and D$_{95}$ of the cathode material were 2.6 μm, 11.4 μm and 21.2 μm, respectively, and K95 was 1.63.

Upon testing, the cathode material had a powder compaction density reached 3.70 g/cm$^3$ under a pressure condition of 20 kN, the specific surface area A1 of the cathode material was 0.50 m$^2$/g; the specific surface area A2 of the cathode material was 0.58 m$^2$/g after compression with a pressure of 4.5 T, (A2−A1)/A1×100% was 16%.

Example 5

The cathode material was prepared according to the method of Example 1, except that step (2) was not carried out, the first sintered material obtained from step (1) was multicrystal particles A having a composition of Li$_{1.03}$(Ni$_{0.83}$Co$_{0.060}$Mn$_{0.11}$Zr$_{0.005}$)O$_2$F$_{0.01}$. The particle diameters D$_5$, D$_{50}$ and D$_{95}$ of the multicrystal particles A were 9.0 μm, 13.1 μm and 19 μm, respectively, and K$_A$95 was 0.76; an average particle strength was 82 MPa by testing with a micro-mechanical testing machine, a deformation quantity of the multicrystal particles A prior to fracture was 1.8 μm, which accounted for 13.7% of D$_{50}$ of the particles prior to fracture.

Steps (3) and (4) of Example 4 were carried out according to steps (3) and (4) of Example 1. The cathode material having a composition of (Li$_{1.024}$(Ni$_{0.83}$Co$_{0.06}$Mn$_{0.11}$Zr$_{0.005}$)O$_2$F$_{0.007}$)0.007P was finally prepared. The particle diameters D$_5$, D$_{50}$ and D$_{95}$ of the cathode material were 2.5 μm, 10.9 μm and 20.5 μm, respectively, and K95 was 1.65.

Upon testing, the cathode material had a powder compaction density reached 3.55 g/cm$^3$ under a pressure condition of 20 kN, the specific surface area A1 of the cathode material was 0.54 m$^2$/g; the specific surface area A2 of the cathode material was 0.71 m$^2$/g after compression with a pressure of 4.5 T, (A2−A1)/A1×100% was 30%.

Comparative Example 1

A cathode material was prepared according to the method of Example 1, except that steps (3) and (4) were not carried out. The multicrystal particles A were used as the cathode material. The particle diameters D$_5$, D$_{50}$ and D$_{95}$ of the multicrystal particles A were 8.5 μm, 12.6 μm and 18.4 μm, respectively, and K$_A$95 was 0.78; an average particle strength was 98 MPa by testing with a micro-mechanical testing machine, a deformation quantity of the multicrystal particles A prior to fracture was 2.5 μm, which accounted for 19.8% of D$_{50}$ of the particles prior to fracture.

Upon testing, the cathode material had a powder compaction density of 3.2 g/cm$^3$ under a pressure condition of 20 kN;

The specific surface area A1 of the cathode material was 0.42 m$^2$/g; the specific surface area A2 of the cathode material was 0.68 m$^2$/g after compression with a pressure of 4.5 T, (A2−A1)/A1×100% was 62%.

Comparative Example 2

(1) Preparation of multicrystal particles A: the following compounds were calculated in terms of the molar ratio, wherein the molar ratio of transition metal hydroxide precursor $Ni_{0.83}Co_{0.06}Mn_{0.11}(OH)_2$:LiOH was 1:1.09, the compounds were blended uniformly and then subjected to sintering at 600° C. for 10 h to obtain a first sintered material; wherein the temperature rise time was 6 h, and the constant temperature time was 4 h;

(2) the first sintered material, artificial graphite and conductive polyaniline were blended according to a mass ratio of 1:0.05:0.05, the compounds were blended by using a high-speed mixer, and then subjected to sintering at 200° C. for 6 h, to finally obtaining the multicrystal particles A coated with a cladding layer P on the surface thereof, the multicrystal particles A had a composition $(Li_{1.09}(Ni_{0.83}Co_{0.06}Mn_{0.1102})0.1P$. The particle diameters $D_5$, $D_{50}$ and $D_{95}$ of the multicrystal particles A were 4.5 μm, 10.5 μm and 21.5 μm, respectively, and $K_A95$ was 1.6; an average particle strength was 100 MPa by testing with a micro-mechanical testing machine, a deformation quantity of the multicrystal particles A prior to fracture was 1.9 μm, which accounted for 18.1% of $D_{50}$ of the particles prior to fracture.

(3) Preparation of single crystal particles or quasi single crystal particles B: the following compounds were calculated in terms of molar ratio, wherein the molar ratio of a transition metal hydroxide precursor $Ni_{0.83}Co_{0.06}Mn_{0.11}(OH)_2$:LiOH:$ZrO_2$ was 1:1.02:0.01, the compounds were blended uniformly and then subjected to sintering at 1,000° C. for 24 h to obtain the single crystal particles or quasi single crystal particles B having a composition of $Li_{1.02}(Ni_{0.83}Co_{0.06}Mn_{0.11}Zr_{0.01})O_2$, wherein the particle diameters $D_5$, $D_{50}$ and $D_{95}$ of the single crystal particles or quasi single crystal particles B were 1.8 μm, 4.3 μm and 11.5 μm, respectively, and the $K_B95$ was 2.25.

(4) The blending method in Comparative Example 2 was identical with that in Example 1, the compounds were blended by using a high-speed mixer to obtain a cathode material. The particle diameters $D_5$, $D_{50}$ and $D_{95}$ of the cathode material were 1.6 μm, 9 μm and 24.5 μm, respectively, and K95 was 2.54.

Upon testing, the cathode material had a powder compaction density reached 3.46 g/cm³ under a pressure condition of 20 kN, the specific surface area A1 of the cathode material was 0.33 m²/g; the specific surface area A2 of the cathode material was 0.45 m²/g after compression with a pressure of 4.5 T, (A2-A1)/A1×100% was 36%.

TABLE 1

Performance parameters of the cathode material

| | Particles A | | | Particles B $K_B95$ | Cathode material | | | |
|---|---|---|---|---|---|---|---|---|
| | $K_A95$ | Particle strength/ MPa | Deformation quantity/ % | | K95 | Compaction density/ g/cm³ | Specific surface area A1/m²/g | Specific surface area A2/m²/g | (A2 − A1)/ A1 × 100% |
| Example 1 | 0.78 | 98 | 19.8 | 1.55 | 1.7 | 3.65 | 0.56 | 0.68 | 21 |
| Example 2 | 0.78 | 95 | 19.2 | 1.48 | 1.86 | 3.6 | 0.61 | 0.74 | 21 |
| Example 3 | 0.79 | 89 | 21.6 | 1.48 | 1.69 | 3.63 | 0.58 | 0.71 | 22 |
| Example 4 | 0.93 | 102 | 16.8 | 1.48 | 1.63 | 3.70 | 0.50 | 0.58 | 16 |
| Example 5 | 0.76 | 82 | 13.7 | 1.55 | 1.65 | 3.55 | 0.54 | 0.71 | 30 |
| Comparative Example 1 | 0.78 | 98 | 19.8 | / | 0.78 | 3.20 | 0.42 | 0.68 | 62 |
| Comparative Example 2 | 1.6 | 78 | 18.1 | 2.25 | 2.54 | 3.46 | 0.33 | 0.45 | 36 |

As shown in Table 1, firstly, both the compaction density and the BET increase after fracturing under a pressure condition of 4.5 T of the cathode material after blending the multicrystal particles A with the particles B are significantly enhanced and improved. Secondly, the elastic cladding layer on the surface of the multicrystal particles A can effectively enhance strength of the individual particles and alleviate the cracking extent of particles during the long cyclic process; the K95 of the cathode material prepared in the Comparative Examples does not fall into the protection scope of the present disclosure. The particles are more dispersed with weaker strength, which is adverse to long-term cycle use.

Test Examples (1) Cathode Electrode of Lithium Ion Battery:
the cathode materials prepared in the Examples and Comparative Examples were blended with carbon black and polyvinylidene fluoride (PVDF) according to a weight ratio of 95:2.5:2.5, the mixture was coated on aluminum foils, and subjected to drying, cutting and rolling to prepare the cathode electrode of lithium ion battery.

(2) Pouch Cell
The artificial graphite was used as the anode, the polyethylene (PE) was used as the separators, and the cathode electrode of lithium ion battery was used as the cathode electrode; specifically, the anode was the anode electrode obtained by coating the copper foil with the artificial graphite, and subjected to drying, cutting and rolling; the PE separators were added between the cathode electrode and the anode electrode, and subjected to winding, encapsulating into a housing, injecting with an electrolyte and sealing, and processed into the winding-type pouch cell, the properties of the pouch cell were shown in Table 2.

Figure 5:
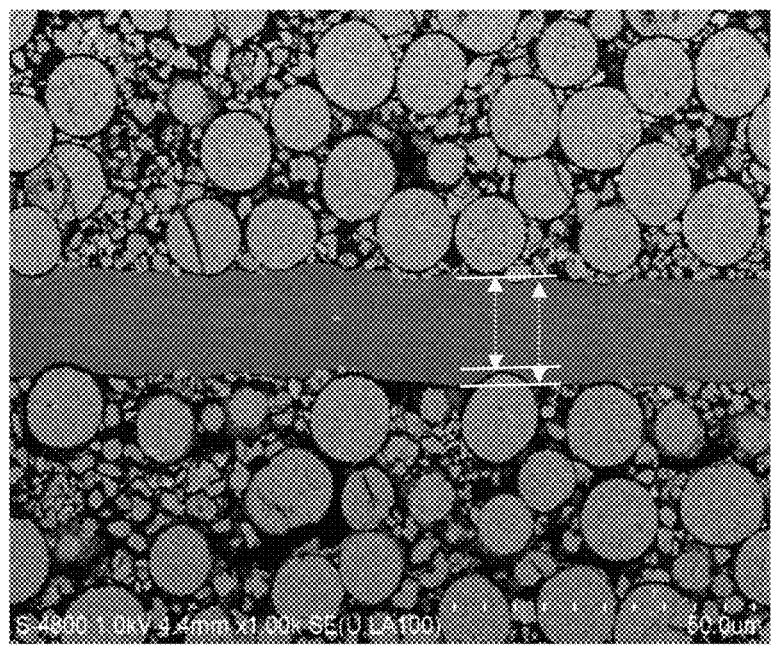
FIG. 5 illustrates the cross-sectional view of a cathode electrode prepared in Example 1 after subjecting to rolling.

The SEM of a cross-sectional view of a cathode electrode prepared with the cathode electrode of Example 1 after subjecting to rolling was shown in FIG. 5, which illustrated the presence of single crystal particles or quasi single crystal particles B, indicating that the cathode material of Example 1 was capable of reducing extrusion on the current collector.

FIG. 4 illustrated the cycle curves of the pouch cells comprising the cathode using the cathode electrode produced from the cathode material prepared in Example 1 and Comparative Example 1, respectively. As shown in FIG. 4, the cycle stability of the pouch cells comprising the cathode electrodes produced from the cathode materials of Example 1 was significantly improved compared to the Comparative Example 1.

TABLE 2

| | Cathode electrode Compaction density/ g/cm³ | Pouch cell | | |
|---|---|---|---|---|
| | | Discharge capacity/ mAh/g | charge- discharge cycle life for 1,000 times/% | Gas production rate stored at 60° C. for 30 days/% |
| Example 1 | 3.55 | 205 | 92 | 5.5 |
| Example 2 | 3.56 | 206 | 89 | 7.2 |
| Example 3 | 3.55 | 204 | 91 | 6.5 |
| Example 4 | 3.58 | 203 | 93 | 4.6 |
| Example 5 | 3.45 | 206 | 87 | 10 |
| Comparative Example 1 | 3.15 | 204 | 84 | 30 |
| Comparative Example 2 | 3.35 | 203 | 86 | 12 |

As shown by Table 2, the compaction density of cathode electrode prepared with the cathode material of the present disclosure is significantly improved, and it effectively suppresses generation of the micro-crack in the material during the charge and discharge process, the cycle life and the aerogenesis performance are also remarkably enhanced. Secondly, the elastic cladding layer on a surface of the multicrystal particles A also effectively buffers the extrusion of particles on the current collector under a premise without substantially affecting the capacity, the cycle life is enhanced.

The above content describes in detail the preferred embodiments of the present disclosure, but the present disclosure is not limited thereto. A variety of simple modifications can be made in regard to the technical solutions of the present disclosure within the scope of the technical concept of the present disclosure, including a combination of individual technical features in any other suitable manner, such simple modifications and combinations thereof shall also be regarded as the content disclosed by the present disclosure, each of them falls into the protection scope of the present disclosure.

What is claimed is:

1. A cathode material comprising multicrystal particles (A) and single crystal particles or quasi single crystal particles (B);
    the particle diameters $D_5$, $D_{50}$ and $D_{95}$ of the cathode material satisfy the relationship shown in Formula I:

$$1.5 \leq K95 = (D_{95} - D_5)/D_{50} \leq 2.5 \quad \text{Formula I};$$

wherein the surface of the multicrystal particles (A) is coated with a cladding layer (P);
    wherein the cladding layer (P) is provided by conductive graphite and conductive polymer, or
    wherein the cladding layer (P) is provided by conductive polymer;
    wherein a mass ratio of the multicrystal particles (A) to the cladding layer (P) is 1:0.001-0.05, based on the total weight of the multicrystal particles (A);
    wherein the cathode material has a composition represented by Formula (1):

$$[Li_{1+a}(Ni_xCo_yMn_zM_{1-x-y-z})N_kO_{2-w}J_w]\pi \quad (1);$$

in the Formula (1), $0 \leq a \leq 0.3$, $0.83 \leq x \leq 1$, $0 \leq y \leq 1$, $0 \leq z \leq 1$, $0 \leq k \leq 0.1$, $0 \leq w \leq 0.1$, M is at least one selected from the group consisting of B, Na, K, Mg, Al, Ca, Ti, Fe, Zn, Sr, Y, Zr, Nb, Mo, Sn, Ba, Ta and W;
    N is at least one selected from the group consisting of B, Mg, Al, Ti, V, Sr, Y, Zr, Nb, Mo and W;
    J is at least one selected from the group consisting of F, Cl and P,
    wherein the particle diameters $D_5$, $D_{50}$ and $D_{95}$ of the multicrystal particles (A) satisfy the relationship shown in Formula II:

$$0 < K_A 95 = (D_{95} - D_5)/D_{50} < 1 \quad \text{Formula II};$$

wherein the cathode material has a powder compaction density greater than or equal to 3.63 g/cm³ under a pressure condition of 20 kN, and
    wherein content of Ni in the multicrystal particles (A) is equal with content of Ni in single crystal particles or quasi single crystal particles (B).

2. The cathode material of claim 1, wherein $1.5 \leq K95 \leq 2$.

3. The cathode material of claim 1, wherein the multicrystal particles (A) have a particle diameter $D_{50}$ within a range of 7-22 μm;
    and/or, the single crystal particles or quasi single crystal particles (B) have a particle diameter $D_{50}$ within a range of 0.2-7 μm;
    and/or, the particle diameters $D_5$, $D_{50}$ and $D_{95}$ of the single crystal particles or quasi single crystal particles (B) satisfy the relationship shown in Formula III:

$$0.2 \leq K_B 95 = (D_{95} - D_5)/D_{50} \leq 3 \quad \text{Formula III}.$$

4. The cathode material of claim 1, wherein the conductive polymer is at least one selected from the group consisting of polyaniline, polypyrrole, polythiophene, polyacetylene, poly(para-phenylene sulfide), poly(3,4-ethylenedioxythiophene) and polyphenylacetylene.

5. The cathode material of claim 1, wherein a mass ratio of the multicrystal particles (A) to the single crystal particles or quasi single crystal particles (B) in the cathode material is 0.01-9:1.

6. The cathode material of claim 1, wherein an individual particle strength of the multicrystal particles (A) in a test of the micro-mechanical testing machine is greater than or equal to 50 MPa;
    and, a deformation quantity of the multicrystal particles (A) prior to fracture is within a range $D_{50} \times (5\text{-}25\%)$ of the multicrystal particles (A).

7. The cathode material of claim 1, wherein
    a specific surface area of the cathode material is denoted as A1, the specific surface area of the cathode material after a pressure fracturing of 4.5 T is denoted as A2;
    wherein $(A2-A1)/A1 \times 100\% \leq 40\%$.

8. A lithium ion battery comprising the cathode electrode prepared with the cathode material of claim 1.

* * * * *